United States Patent
Francois et al.

(10) Patent No.: US 11,172,226 B2
(45) Date of Patent: Nov. 9, 2021

(54) METHOD AND APPARATUS FOR GENERATING QUANTIZATION MATRICES IN VIDEO ENCODING AND DECODING

(71) Applicant: InterDigital VC Holdings, Inc., Wilmington, DE (US)

(72) Inventors: Edouard Francois, Cesson-Sevigne (FR); Fabrice Leleannec, Cesson-Sevigne (FR); Philippe De Lagrange, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 38 days.

(21) Appl. No.: 16/651,861

(22) PCT Filed: Nov. 13, 2018

(86) PCT No.: PCT/US2018/060706
§ 371 (c)(1),
(2) Date: Mar. 27, 2020

(87) PCT Pub. No.: WO2019/094919
PCT Pub. Date: May 16, 2019

(65) Prior Publication Data
US 2020/0260116 A1    Aug. 13, 2020

(30) Foreign Application Priority Data
Nov. 13, 2017 (EP) .................................. 17306570

(51) Int. Cl.
*H04N 7/12* (2006.01)
*H04N 19/61* (2014.01)
(Continued)

(52) U.S. Cl.
CPC ............. *H04N 19/61* (2014.11); *H04N 19/12* (2014.11); *H04N 19/126* (2014.11);
(Continued)

(58) Field of Classification Search
CPC .................................................... H04N 19/126
See application file for complete search history.

(56) References Cited

FOREIGN PATENT DOCUMENTS

| EP | 3026911 A1 | 6/2016 |
|----|------------|--------|
| WO | WO2013032794 A1 | 3/2013 |

OTHER PUBLICATIONS

Zhao et al., "Enhanced Multiple Transform for Video Coding", 2016 Data Compression Conference (DCC), Mar. 30-Apr. 1, 2016, pp. 73-82, IEEE, Snowbird, UT, USA.

(Continued)

*Primary Examiner* — Y Lee
(74) *Attorney, Agent, or Firm* — Xiaoan Lu

(57) ABSTRACT

When a 2D separable transform is used in video encoding and decoding, two 1D quantization matrices (QMs) are designed based on the horizontal transform and vertical transform of the 2D separable transform. The choice of a 1D QM can be based on whether the horizontal or vertical transform is transform skip, or based on the type of horizontal or vertical transform. Then a 2D QM can be obtained from the product of those two 1D QMs. In a different implementation, an initial 2D QM may be modified based on the 1D QMs. The 2D QMs can be pre-computed and stored in a look-up table for the encoder and decoder. During quantization and de-quantization, the 2D QM to be used for a block can be computed on the fly or retrieved from the look-up table based on the 2D separable transform that is used for the block.

20 Claims, 8 Drawing Sheets

(51) Int. Cl.
- *H04N 19/126* (2014.01)
- *H04N 19/157* (2014.01)
- *H04N 19/176* (2014.01)
- *H04N 19/189* (2014.01)
- *H04N 19/44* (2014.01)
- *H04N 19/12* (2014.01)
- *H04N 19/645* (2014.01)

(52) U.S. Cl.
CPC ......... *H04N 19/157* (2014.11); *H04N 19/176* (2014.11); *H04N 19/189* (2014.11); *H04N 19/45* (2014.11); *H04N 19/645* (2014.11)

(56) References Cited

OTHER PUBLICATIONS

Gabriellini et al., "Adaptive transform skipping for improved coding of motion compensated residuals", Signal Processing: Image Communication, Elsevier Science Publishers, Amsterdam, NL, vol. 28, No. 3, Dec. 5, 2012, pp. 197-208.

Zhong et al.,"Adaptive horizontal and vertical transform skip scheme for H. 264/AVC.", Optical Engineering, Soc. of Photo-Optical Instrumentation Engineers, Bellingham, vol. 51, No. 9, Sep. 2012, pp. 97402-1-97402-10.

Lou et al., "Quantization matrices for 4x4 and 8x8 TUs matching HEVC integer transforms", Joint Collaborative Team on Video Coding (JCT-VC) of ITU-T SG-16 WP3 and ISU/IEC JTC1/SC29/WG-II, Document: JCTVC-H0495r3, 8th Meeting: San Jose, CA, USA, Feb. 1-10, 2012.

Naccari et al., "CE5. a: Quantization for transform skipping", Joint Collaborative Team on Video Coding (JCT-VC) of ITU-T SG16 WP3 and ISO/IEC JTC1/SC29/WG11, Document: JCTVC-H0208, 8th Meeting, San Jose, CA, USA, Feb. 1-10, 2012.

METHOD AND APPARATUS FOR GENERATING QUANTIZATION MATRICES IN VIDEO ENCODING AND DECODING

This application claims the benefit, under 35 U.S.C. § 371 of International Application No. PCT/US18/060706, filed Nov. 13, 2018, which was published on May 16, 2019, which claims the benefit of European Patent Application No. EP17306570.7 filed Nov. 13, 2017.

TECHNICAL FIELD

The present embodiments generally relate to a method and an apparatus for video encoding or decoding, and more particularly, to a method and an apparatus for determining quantization matrices in video encoding or decoding.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

According to a general aspect of at least one embodiment, a method for encoding video data is presented, comprising: accessing prediction residuals of a block of an image in a video; quantizing said prediction residuals based on a quantization matrix; transforming said quantized prediction residuals based on a separable transform to form transform coefficients, wherein said separable transform corresponds to a first transform and a second transform, and wherein said quantization matrix is based on at least one of a transform type of said first transform and a transform type of said second transform; and encoding said transform coefficients.

According to another general aspect of at least one embodiment, a method for decoding video data is presented, comprising: accessing transform coefficients of a block of an image in a video; de-quantizing said transform coefficients based on a quantization matrix; transforming said de-quantized transform coefficients based on a separable transform to form decoded prediction residuals, wherein said separable transform corresponds to a first transform and a second transform, and wherein said quantization matrix is based on at least one of a transform type of said first transform and a transform type of said second transform; and decoding said block based on said decoded prediction residuals.

According to another general aspect of at least one embodiment, an apparatus for encoding video data is presented, comprising: means for accessing prediction residuals of a block of an image in a video; means for quantizing said prediction residuals based on a quantization matrix; means for transforming said quantized prediction residuals based on a separable transform to form transform coefficients, wherein said separable transform corresponds to a first transform and a second transform, and wherein said quantization matrix is based on at least one of a transform type of said first transform and a transform type of said second transform; and encoding said transform coefficients.

According to another general aspect of at least one embodiment, an apparatus for decoding video data is presented, comprising at least a memory and one or more processors, wherein said one or more processors are configured to: access transform coefficients of a block of an image in a video; de-quantize said transform coefficients based on a quantization matrix; transform said de-quantized transform coefficients based on a separable transform to form decoded prediction residuals, wherein said separable transform corresponds to a first transform and a second transform, and wherein said quantization matrix is based on at least one of a transform type of said first transform and a transform type of said second transform; and decoding said block based on said decoded prediction residuals.

According to another general aspect of at least one embodiment, an apparatus for decoding video data is presented, comprising: means for accessing transform coefficients of a block of an image in a video; means for de-quantizing said transform coefficients based on a quantization matrix; means for transforming said de-quantized transform coefficients based on a separable transform to form decoded prediction residuals, wherein said separable transform corresponds to a first transform and a second transform, and wherein said quantization matrix is based on at least one of a transform type of said first transform and a transform type of said second transform; and decoding said block based on said decoded prediction residuals.

According to another general aspect of at least one embodiment, an apparatus for encoding video data is provided, comprising at least a memory and one or more processors, wherein said one or more processors are configured to: access prediction residuals of a block of an image in a video; quantize said prediction residuals based on a quantization matrix; transform said quantized prediction residuals based on a separable transform to form transform coefficients, wherein said separable transform corresponds to a first transform and a second transform, and wherein said quantization matrix is based on at least one of a transform type of said first transform and a transform type of said second transform; and encoding said transform coefficients.

According to another general aspect of at least one embodiment, said quantizing, de-quantizing is further based on a quantization parameter.

According to another general aspect of at least one embodiment, said first transform corresponds to vertical transform, and second transform corresponds to horizontal transform. Said first or second transform may be identity transform, or based on DCT or DST.

According to another general aspect of at least one embodiment, a size of said block is M×N, M being a width and N being a height of said block, wherein a size of said first transform is N×N and a size of said second transform is M×M, and wherein said quantization matrix is based on at least one of a first vector containing N elements and a second vector containing M elements, said first and second vectors corresponding to said transform types of first and second transforms, respectively. M and N may be the same or different.

According to another general aspect of at least one embodiment, said quantization matrix is based on a matrix product of said first vector and second vector. Coefficients of said matrix product may be scaled by respective scaling factors to obtain said quantization matrix. Said respective scaling factors may be based on a power function of a value and corresponding locations of said coefficients.

According to another general aspect of at least one embodiment, said quantization matrix is generated from said first vector and second vector, based on one or more constraints, said one or more constraints including: (1) said function is commutative with respect to said first vector and said second vector; (2) said function is equal to a first quantization matrix defined for a particular separable transform, when a combination of said first transform and said second transform corresponds to said particular separable transform.

According to another general aspect of at least one embodiment, when said first transform is transform skip, all elements in a row of said quantization matrix are same, or when said second transform is transform skip, all elements in a column of said quantization matrix are same.

According to another general aspect of at least one embodiment, if transform skip is used for said first or second transform, a first row or a first column of an initial quantization matrix is accessed, and values of said first row or column are duplicated for other rows or columns to generate said quantization matrix. When both first and second transforms use transform skip, all elements in said quantization matrix are same.

According to another general aspect of at least one embodiment, an initial quantization matrix is accessed, and said initial quantization matrix is modified to form said quantization matrix, based on said transform type of at least one of said first and second transforms. Whether to use said initial quantization matrix or to modify said quantization matrix may be signaled in a bitstream.

According to another general aspect of at least one embodiment, a bitstream is formatted to include signal indicating prediction residuals of a block of an image in a video, wherein said prediction residuals are quantized based on a quantization matrix, wherein said quantized prediction residuals are transformed based on a separable transform, wherein said separable transform corresponds to at least a first transform and a second transform, and wherein said quantization matrix is based on at least one of a transform type of said first transform and a transform type of said second transform.

One or more of the present embodiments also provide a computer readable storage medium having stored thereon instructions for encoding or decoding video data according to any of the methods described above. The present embodiments also provide a computer readable storage medium having stored thereon a bitstream generated according to the methods described above. The present embodiments also provide a method and apparatus for transmitting the bitstream generated according to the methods described above. The present embodiments also provide a computer program product including instructions for performing any of the methods described.

DETAILED DESCRIPTION

Figure 1:
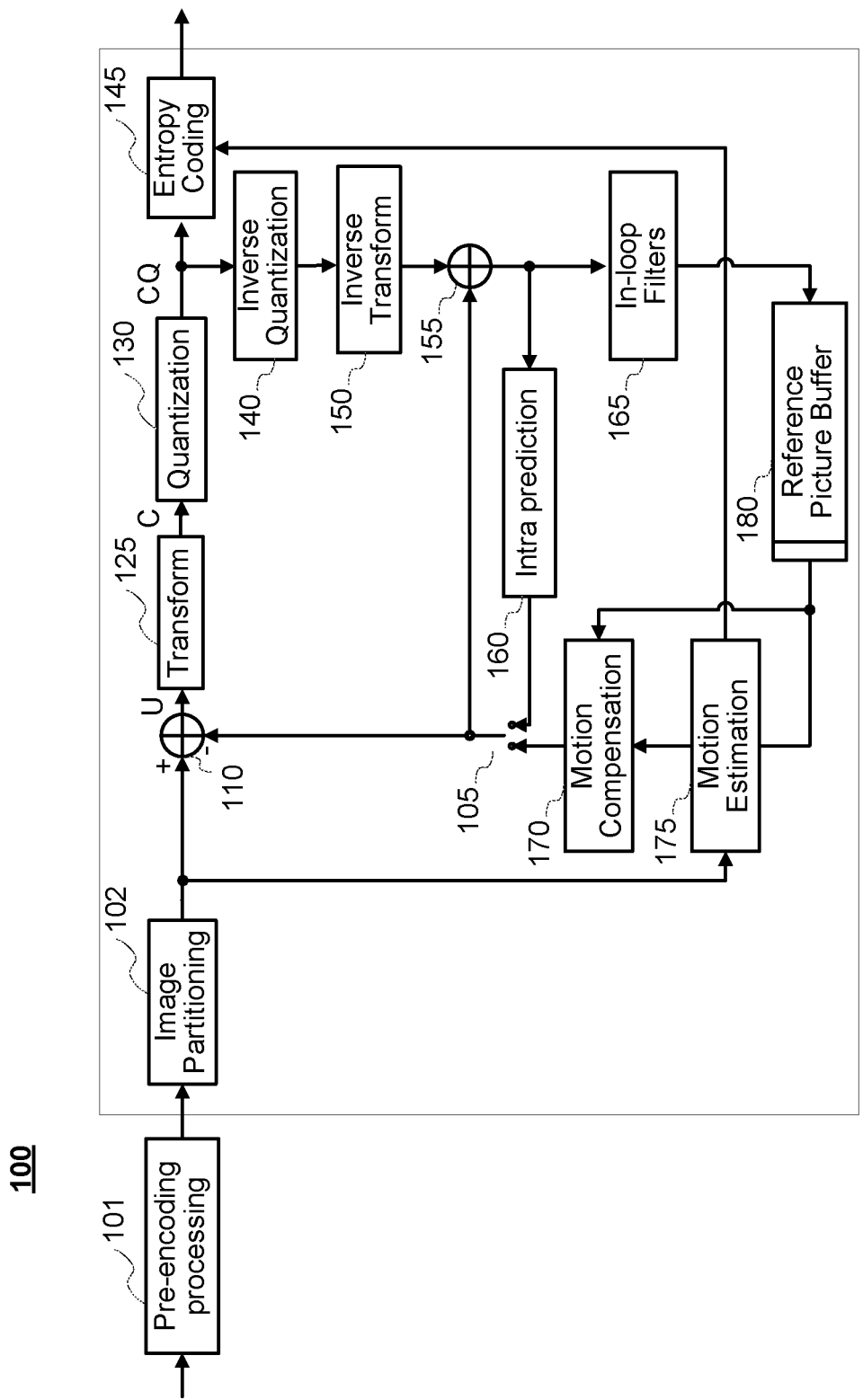
FIG. 1 illustrates a block diagram of an embodiment of a video encoder.

FIG. 1 illustrates an exemplary video encoder 100, such as an High Efficiency Video Coding (HEVC) encoder. FIG. 1 may also illustrate an encoder in which improvements are made to the HEVC standard or an encoder employing technologies similar to HEVC, such as a JEM (Joint Exploration Model) encoder under development by JVET (Joint Video Exploration Team).

In the present application, the terms "reconstructed" and "decoded" may be used interchangeably, the terms "encoded" or "coded" may be used interchangeably, and the terms "image," "picture" and "frame" may be used interchangeably. Usually, but not necessarily, the term "reconstructed" is used at the encoder side while "decoded" is used at the decoder side.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In HEVC, to encode a video sequence with one or more pictures, a picture is partitioned (102) into one or more slices where each slice can include one or more slice segments. A slice segment is organized into coding units, prediction units, and transform units. The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU. In the present application, the term "block" can be used to refer, for example, to any of CTU, CU, PU, TU, CB, PB, and TB. In addition, the "block" can also be used to refer to a macroblock and a partition as specified in H.264/AVC or other video coding standards, and more generally to refer to an array of data of various sizes.

In the exemplary encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra % inter decision by a prediction mode flag. Prediction residuals are calculated by subtracting (110) the predicted block from the original image block.

CUs in intra mode are predicted from reconstructed neighboring samples within the same slice. A set of 35 intra prediction modes is available in HEVC, including a DC, a planar, and 33 angular prediction modes. The intra prediction reference is reconstructed from the row and column adjacent to the current block. The reference extends over two times the block size in the horizontal and vertical directions using available samples from previously reconstructed to blocks. When an angular prediction mode is used for intra prediction, reference samples can be copied along the direction indicated by the angular prediction mode.

The applicable luma intra prediction mode for the current block can be coded using two different options. If the applicable mode is included in a constructed list of three most probable modes (MPM), the mode is signaled by an index in the MPM list. Otherwise, the mode is signaled by a fixed-length binarization of the mode index. The three most probable modes are derived from the intra prediction modes of the top and left neighboring blocks.

For an inter CU, the corresponding coding block is further partitioned into one or more prediction blocks. Inter prediction is performed on the PB level, and the corresponding PU contains the information about how inter prediction is performed. The motion information (e.g., motion vector and reference picture index) can be signaled in two methods, namely, "merge mode" and "advanced motion vector prediction (AMVP)".

In the merge mode, a video encoder or decoder assembles a candidate list based on already coded blocks, and the video encoder signals an index for one of the candidates in the candidate list. At the decoder side, the motion vector (MV) and the reference picture index are reconstructed based on the signaled candidate.

In AMVP, a video encoder or decoder assembles candidate lists based on motion vectors determined from already coded blocks. The video encoder then signals an index in the candidate list to identify a motion vector predictor (MVP) and signals a motion vector difference (MVD). At the decoder side, the motion vector (MV) is reconstructed as MVP+MVD. The applicable reference picture index is also explicitly coded in the PU syntax for AMVP.

The prediction residuals are then transformed (125) and quantized (130). The transforms are generally based on separable transforms. For instance, a DCT transform is first applied in the horizontal direction, then in the vertical direction. In recent codecs such as the JEM, the transforms used in both directions may differ (e.g., DCT in one direction, DST in the other one), which leads to a wide variety of 2D transforms, while in previous codecs, the variety of 2D transforms for a given block size is usually limited.

The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded to directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 2:
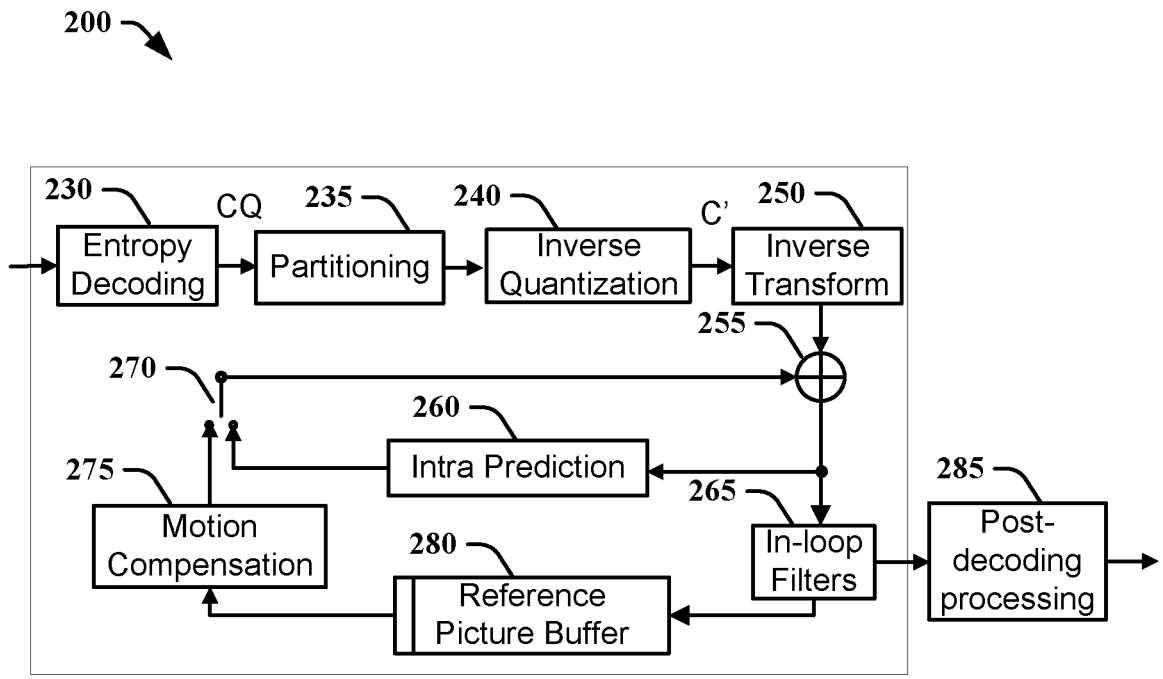
FIG. 2 illustrates a block diagram of an embodiment of a video decoder.

FIG. 2 illustrates a block diagram of an exemplary video decoder 200, such as an HEVC decoder. In the exemplary decoder 200, a bitstream is decoded by the decoder elements as described below. Video decoder 200 generally performs a decoding pass reciprocal to the encoding pass as described in FIG. 1, which performs video decoding as part of encoding video data. FIG. 2 may also illustrate a decoder in which improvements are made to the HEVC standard or a decoder employing technologies similar to HEVC, such as a JEM decoder.

In particular, the input of the decoder includes a video bitstream, which may be generated by video encoder 100. The bitstream is first entropy decoded (230) to obtain transform coefficients, motion vectors, picture partitioning information, and other coded information. The picture partitioning information indicates the size of the CTUs, and a manner a CTU is split into CUs, and possibly into PUs when applicable. The decoder may therefore divide (235) the picture into CTUs, and each CTU into CUs, according to the decoded picture partitioning information. The transform coefficients are de-quantized (240) and inverse transformed (250) to decode the prediction residuals.

Combining (255) the decoded prediction residuals and the predicted block, an image block is reconstructed. The predicted block may be obtained (270) from intra prediction (260) or motion-compensated prediction (i.e., inter prediction) (275). As described above, AMVP and merge mode techniques may be used to derive motion vectors for motion compensation, which may use interpolation filters to calculate interpolated values for sub-integer samples of a reference block. In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing may use metadata derived in the pre-encoding processing and signaled in the bitstream.

Figure 3:
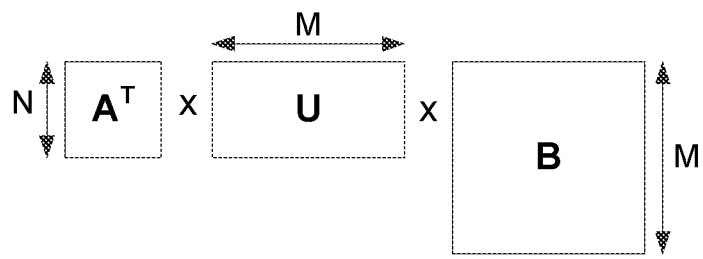
FIG. 3 is a pictorial example illustrating 2D separable transform.

As described above, the prediction residuals are transformed and quantized. Considering an M×N (M columns×N rows) residual block ($[U]_{M \times N}$) that is input to a 2D M×N forward transform, the 2D transform is typically implemented by applying an N-point transform to each column (i.e., vertical transform) and an M-point transform to each row (i.e., horizontal transform) separately, as illustrated in FIG. 3. Mathematically, the forward transform can be expressed as:

$$[C]_{M \times N} = [A]^T_{N \times N} \times [U]_{M \times N} \times [B]_{M \times M}$$

where $[A]_{N \times N}$ is the N-point transform matrix applied vertically, and $[B]_{M \times M}$ the M-point transform matrix applied horizontally, and "T" (superscript) is the matrix transposition operator. Thus, the separable transform consists in applying the horizontal and vertical transforms successively on each row and each column of the 2D residual block.

The resulting M×N transform coefficients ($[C]_{M \times N}$) are then subject to quantization to obtain quantized transform coefficients ($[CQ]_{M \times N}$). In HEVC, Uniform Reconstruction Quantization (URQ) is used for quantization, which is conceptually equivalent to division by quantization step size (Qstep). More generally for video encoding, it should be noted that other quantization methods may be used, for example, by further considering a quantization rounding offset or using non-uniform quantization.

To quantize the transform coefficients, in HEVC, the encoder can specify, for each transform block size and separately for intra and inter prediction, a customized quantization (scaling) matrix (QM) for use in inverse-quantization scaling by the decoder. The quantization matrix is typically designed to provide more accuracy to coefficients corresponding to frequencies more sensitive to human perception. The goal is to adapt the quantization of the transform coefficients to improve the perceptual quality of the coded video, typically by taking into account the properties of the human visual system to different spatial frequencies of the signal. For example, low frequencies are less quantized than the high frequencies.

Using the quantization matrix generally does not improve objective fidelity as measured by mean-squared error (or, equivalently, PSNR), but it usually improves subjective fidelity. Default values for the quantization scaling matrices are specified in the standard, and the encoder can also choose to use customized values by sending a representation of those values at the sequence or picture level.

More specifically, the transform coefficients are quantized according to the scaling values provided in quantization matrices. After the transform is applied to the residual values, luma and chroma transform coefficients in a Transform Block are individually quantized according to the integer scaling values that are present in the intra and inter QMs. The specification defines default intra and inter QMs in HEVC, that are based on human visual model. If the default matrices are not used as indicated using flags, ad hoc matrices explicitly signaled in the bitstream can be used.

The elements in the QMs apply different quantization scaling to transform coefficients at different frequencies in a Transform Block. Therefore, these QMs possess the capacity to control the quantization step size, and thus to adjust the quantization according to the frequency of the transform coefficient. A Transform Block contains DC and AC transform coefficients, where the DC transform coefficient is the lowest frequency component and the AC coefficients correspond to frequency components from low, medium to high. Because low frequency transform coefficients are usually more important for video signal reconstruction, the default QMs in HEVC apply coarser quantization to medium and high frequency AC transform coefficients.

The quantization at the encoder side is not normative and can be done in different ways. Nevertheless, it typically reproduces or approximates the following formula for an HEVC encoder:

$$CQ[x][y] = \text{sign}(C[x][y]) * (\text{abs}(C[x][y]) * \text{invScale}[QP\ \%6]/QM[x][y] + \text{quantOffset}) >> \text{quantShift}$$

where
  CQ is the block of quantized coefficients,
  C is the block of transform coefficients,
  QM is the quantization matrix,
  invScale[k]={26214, 23302, 20560, 18396, 16384, 14564} with k=0, . . . , 5,
  QP is the quantization parameter,
  quantShift is a parameter that depends on the scaling involved by the forward transform applied at the encoder, on the transform block size, on the signal bit depth, and on QP.
    In the HEVC reference encoder, quantShift=14+QP+TransformShift, where TransformShift relates to the scaling involved by the forward transform,
  quantOffset is a parameter that depends on parameter quantShift, for instance, quantOffset=1<<(quantShift−1),
  (x, y) is the location of the coefficient,
  abs(r) is the absolute value of r,
  sign(r)=−1 if r<0, 1 otherwise,
  "*" is the scalar multiplication, "/" is the integer division with truncation of the result toward zero, and "%" is the modulus operator.

At the decoder side, the QM can be applied in the de-quantization conforming to the HEVC specification based on the following formula:

$$C'[x][y] = (CQ[x][y] * QM[x][y] * \text{levScale}[QP\ \%6] << (QP/6)) + (1<<(\text{bdShift}-1))) >> \text{bdShift}$$

where
  CQ is the block of quantized coefficients,
  C' is the block of de-quantized coefficients,
  QM is the quantization matrix,
  levScale[k]={40, 45, 51, 57, 64, 72} with k=0, . . . , 5,
  QP is the quantization parameter,
  bdShift is defined as follows for the HEVC usual profiles: bdShift=Max(20−bitDepth, 0), bitDepth is the bit depth of the samples of the considered component (e.g., Y, Cb or Cr),
  (x, y) is the location of the coefficient.

Figure 4:
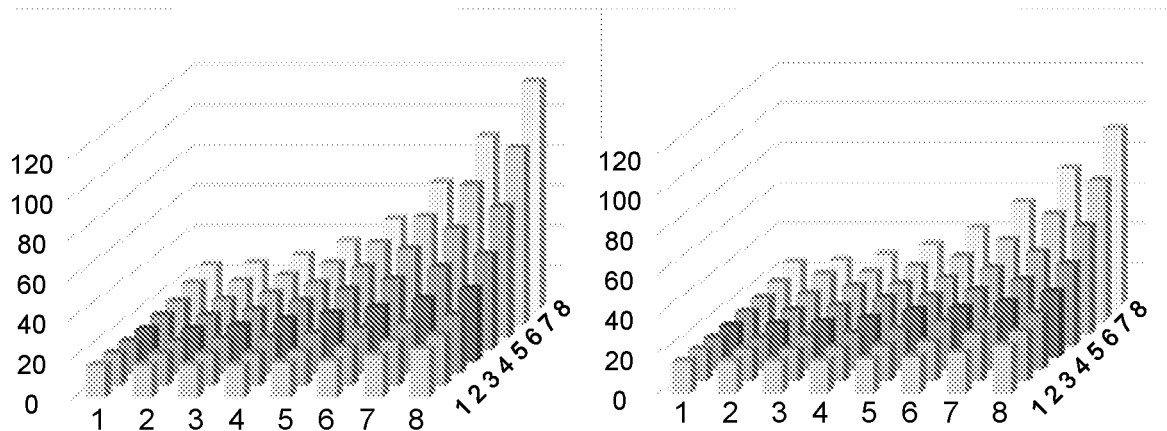
FIG. 4 illustrates the default intra and inter 8×8 quantization matrices (QMs) defined in HEVC.

Default QMs are defined in HEVC for 8×8 transform blocks only, in order to reduce the memory storage needs. The default intra and inter 8×8 QMs defined in HEVC are shown below and illustrated in FIG. 4 (note that they are both symmetric). The QMs for larger blocks are obtained by upsampling the 8×8 QMs. To create a 16×16 QM, each entry in an 8×8 QM is replicated into a 2×2 region. To create a 32×32 QM, each entry in an 8×8 QM is replicated into a 4×4 region. For 4×4 transform blocks, the default QM is flat (all components are equal to 16). The default QMs only depend on the intra/inter mode, but are the same for the Y, Cb and Cr components. The replication rule could also be applied to rectangular blocks (e.g., rectangular blocks in JEM).

$$\begin{pmatrix} 16 & 16 & 16 & 16 & 17 & 18 & 21 & 24 \\ 16 & 16 & 16 & 16 & 17 & 19 & 22 & 25 \\ 16 & 16 & 17 & 18 & 20 & 22 & 25 & 29 \\ 16 & 16 & 18 & 21 & 24 & 27 & 31 & 36 \\ 17 & 17 & 20 & 24 & 30 & 35 & 41 & 47 \\ 18 & 19 & 22 & 27 & 35 & 44 & 54 & 65 \\ 21 & 22 & 25 & 31 & 41 & 54 & 70 & 88 \\ 24 & 25 & 29 & 36 & 47 & 65 & 88 & 115 \end{pmatrix}$$

$$\begin{pmatrix} 16 & 16 & 16 & 16 & 17 & 18 & 20 & 24 \\ 16 & 16 & 16 & 17 & 18 & 20 & 24 & 25 \\ 16 & 16 & 17 & 18 & 20 & 24 & 25 & 28 \\ 16 & 17 & 18 & 20 & 24 & 25 & 28 & 33 \\ 17 & 18 & 20 & 24 & 25 & 28 & 33 & 41 \\ 18 & 20 & 24 & 25 & 28 & 33 & 41 & 54 \\ 20 & 24 & 25 & 28 & 33 & 41 & 54 & 71 \\ 24 & 25 & 28 & 33 & 41 & 54 & 71 & 91 \end{pmatrix}$$

The intra default QM is based on the human visual system, and can be derived as explained in the following process. At first, f, the radial frequency in cycles per degree of the visual angle corresponding to the coefficient at location (u,v), is defined as:

$$f = \frac{K}{\Delta * 2N} * \frac{\sqrt{u^2+v^2}}{S(\theta)}$$

where $$\theta = \arctan\left(\frac{u}{v}\right), \quad S(\theta) = \frac{1-s}{2} * \cos(4\theta) + \frac{1+s}{2},$$

and N is the block width or height (u=0, . . . , N−1, v=0, . . . , N−1, typically N=8), Δ, K and s are constant parameters (to get the HEVC 8×8 QM, Δ should be set to 0.00025, K to 0.00893588, s to 0.7).

Then the Modulation Transfer Function H(f) is defined as $$H(f) = \begin{cases} 2.2*(0.192+0.114*f)*\exp(-(0.114*f)^{1.1}) & \text{if } f > f_{max} \\ 1 & \text{otherwise} \end{cases}$$

where $f_{max}=8$ (cycles per degree). The QM values are computed as Round(16/H(f)) where Round(x) gives the nearest integer value to x.

The inter default QM can be derived from the intra default QM using the following process:
1. QMinter(0,0)=QMintra(0,0)
2. For n=1 . . . N−1

QMinter(0,n)=QMinter(0,n−1)+int(S1*(QMintra(0,n)−QMintra(0,n−1))+0.5),

With S1=0.714285714
3. QMinter(0,N−1)=QMintra(0,N−1)
4. For m=1 . . . N−1

QMinter(m,N−1)=QMinter(m−1,N−1)+int(S3*(QMintra(m,N−1)−QMintra(m−1,N−1))+0.5),

With S3=0.733333333, where int(r) is the nearest integer value of r,
5. For m=1 . . . N−1, For n=0 . . . N−2

QMinter(m,n)=QMinter(m−1,n+1)

The coefficients of the quantization matrices are signaled in the bitstream using scaling lists. There is one scaling list per block size, indexed by the parameter sizeId, and per mode, indexed by the parameter matrixId, both specified as follows:

sizeId=0—block 4×4, 1—block 8×8, 2—block 16×16, 3—block 32×32 matrixId=0—intra Y, 1—intra U, 2—intra V, 3—inter Y, 4—inter U, 5—inter V

For 32×32 blocks, matrixId can only be set to 0 or 3.

The syntax in HEVC specification for signaling the scaling list is reproduced as follows.

| | Descriptor |
|---|---|
| scaling_list_data( ) { | |
|   for( sizeId = 0; sizeId < 4; sizeId++ ) | |
|     for( matrixId = 0; matrixId < 6; matrixId += ( sizeId == 3 ) ? 3 : 1 ) { | |
|       scaling_list_pred_mode_flag[ sizeId ][ matrixId ] | u(1) |
|       if( !scaling_list_pred_mode_flag[ sizeId ][ matrixId ] ) | |
|         scaling_list_pred_matrix_id_delta[ sizeId ][ matrixId ] | ue(v) |
|       else { | |
|         nextCoef = 8 | |
|         coefNum = Min( 64, ( 1 << ( 4 + ( sizeId << 1 ) ) ) ) | |
|         if( sizeId > 1 ) { | |
|           scaling_list_dc_coef_minus8[ sizeId − 2 ][ matrixId ] | se(v) |
|           nextCoef = scaling_list_dc_coef_minus8[ sizeId − 2 ][ matrixId ] + 8 | |
|         } | |

```
         for( i = 0; i < coefNum; i++ ) {
            scaling_list_delta_coef                                    se(v)
            nextCoef = ( nextCoef + scaling_list_delta_coef + 256 ) % 256
            ScalingList[ sizeId ][ matrixId ][ i ] = nextCoef
         }
      }
   }
}
```

Figure 5:
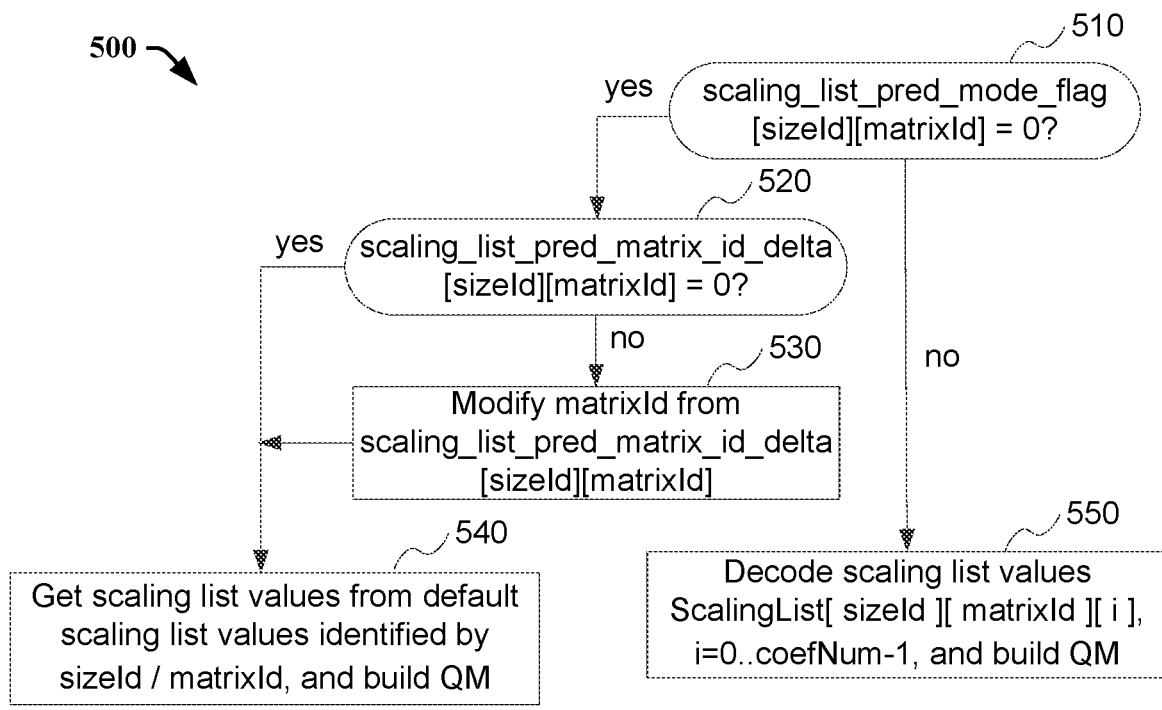
FIG. 5 illustrates a process for determining the QM in HEVC.
Figure 6:
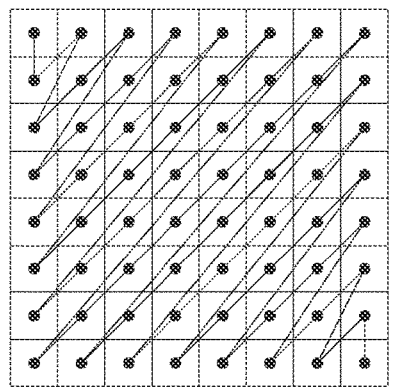
FIG. 6 illustrates the up-right diagonal scanning and the default intra 8×8 QM in HEVC.

For each possible value of the two parameters sizeId and matrixId, process 500 illustrated in FIG. 5 is applied to determine the actual QM from either the default QM, or from explicit decoded values for an exemplary HEVC decoder. At step 510, the decoder checks whether the syntax element scaling_list_pred_mode_flag[sizeId][matrixId] is equal to 0. If not, at step 550, the decoder decodes scaling list values from the variable ScalingList[sizeId][matrixId][i], i=0, . . . , coefNum−1, and builds the QM by the up-right diagonal scanning order as shown in the left of FIG. 6. If scaling_list_pred_mode_flag[sizeId][matrixId] is equal to 0, at step 520, the decoder checks whether the syntax element scaling_list_pred_matrix_id_delta[sizeId][matrixId] is equal to 0. If not, matrixId is modified (530) based on scaling_list_pred_matrix_id_delta[sizeId][matrixId]. At step 540, the scaling list values from the default scaling list values identified by sizeId and matrixId are obtained, and the QM is built, where the default matrix for 8×8 intra is shown in the right of FIG. 6.

As described above, previous video codecs, such as those conforming to HEVC, were based on 2D separable transforms using the same vertical and horizontal transforms. Therefore, the derived QMs were 2D QMs, in general symmetric, adapted to these 2D transforms.

Figure 7:
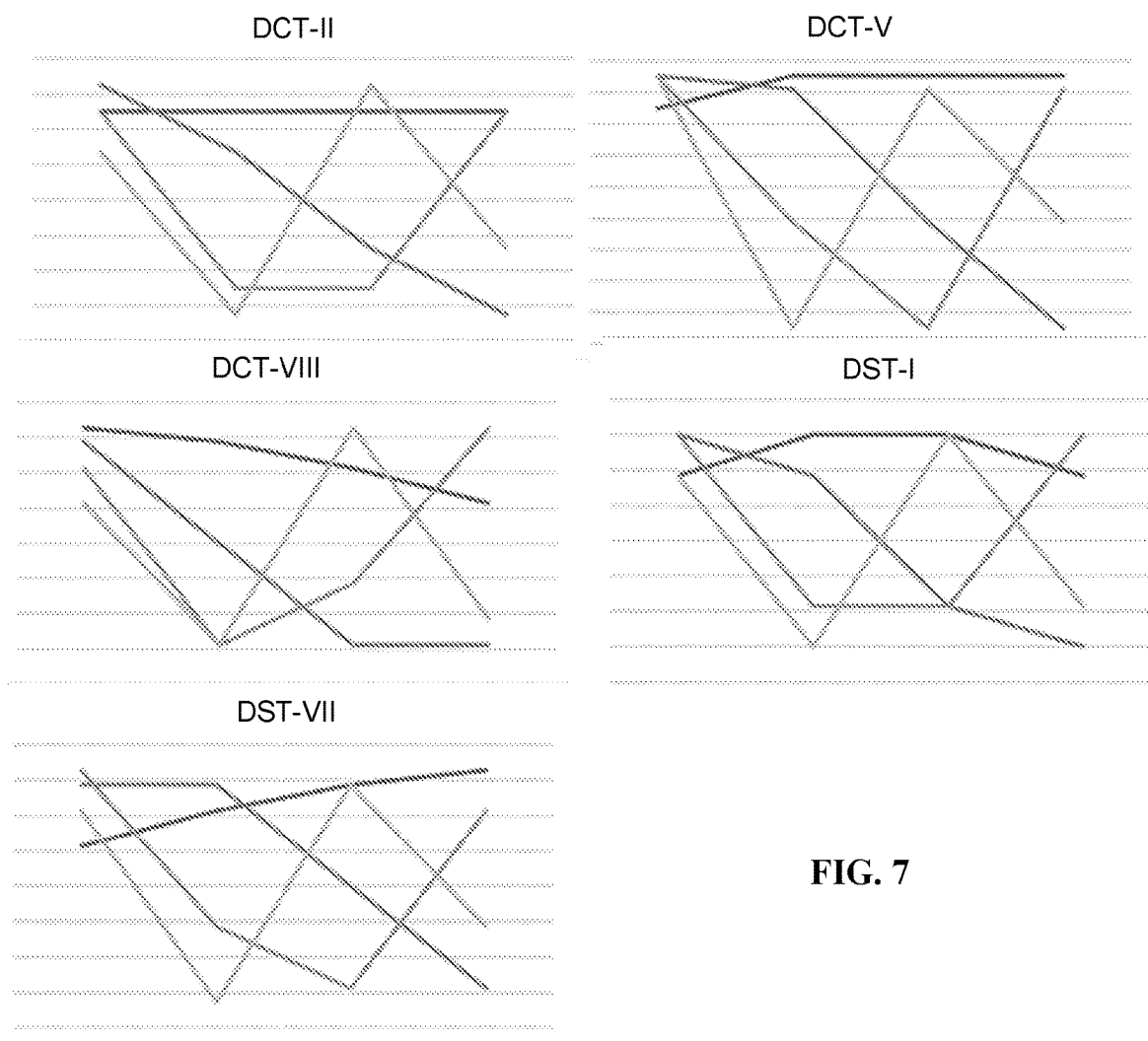
FIG. 7 illustrates different transforms used in JEM (Joint Exploration Model).

However, in the current JEM, five different horizontal/vertical transforms are defined, derived from five transforms as shown in Table 1 and illustrated for 4×4 size in FIG. 7. Flags are used at the CU level, for size from 4×4 to 64×64, to control the combination of transforms. When the CU flag is equal to 0, DCT-II is applied as horizontal and vertical transform. When the CU flag is equal to 1, two additional syntax elements are signalled to identify the horizontal and vertical transforms to be used. Note that other horizontal/vertical transforms could also be considered, such as the identity transform (which corresponds to skipping the transform in one direction).

TABLE 1

Transform basis functions of DCT-II/V/VIII and DST-I/VII for N-point input in JEM.

| Transform Type | Basis function $T_i(j)$, $i, j = 0, 1, \ldots, N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$, where $\omega_0 = \begin{cases} \sqrt{\dfrac{2}{N}} & i=0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$, where $\omega_0 = \begin{cases} \sqrt{\dfrac{2}{N}} & i=0 \\ 1 & i \neq 0 \end{cases}$, $\omega_1 = \begin{cases} \sqrt{\dfrac{2}{N}} & j=0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

For the intra case, the set of possible transforms depends on the intra mode. Three sets are defined as follows:
Set 0: DST-VII, DCT-VIII
Set 1: DST-VII, DST-I
Set 2: DST-VII, DCT-VIII Here set 2 is identical to set 0. However, in the future development set 2 may be modified if beneficial for coding efficiency. For each intra mode and each transform direction (horizontal/vertical), one of these three sets is enabled. For the inter case, only DST-VII and DCT-VIII are enabled, and the same transform is applied for both horizontal and vertical transforms.

Thus, in JEM, the 2D separable transforms are now based on a variety of horizontal/vertical transforms, with any possible combinations of horizontal and vertical transforms, the properties of the 2D separable transforms may noticeably change, and consequently the properties of the resulted 2D transform coefficients. This variety of horizontal/vertical transforms and of their combination lead to a large variety of resulting 2D separable transforms, potentially having noticeable different properties. For instance, the symmetry of the 2D transform is not anymore verified for many of the resulting 2D transforms.

Therefore, there is a problem in the design of the quantization matrices, since the 2D quantization matrices used in previous codecs do not consider the variety of possible 2D transforms resulting from horizontal/vertical transforms of various types.

The present embodiments are directed to methods and apparatus for generating quantization matrices that are adapted to the 2D transforms. In one embodiment, more varieties are introduced in the QMs, relating to specific transforms or combinations of horizontal/vertical transforms. The concept of 1D QMs (which are actually vectors) is also proposed.

The proposed approach can be used off-line to derive the default quantization matrices. Alternatively, it can be used in the encoder or decoder, for example, in case 1D QMs are used, either defined by default, or explicitly signaling.

Figure 8:
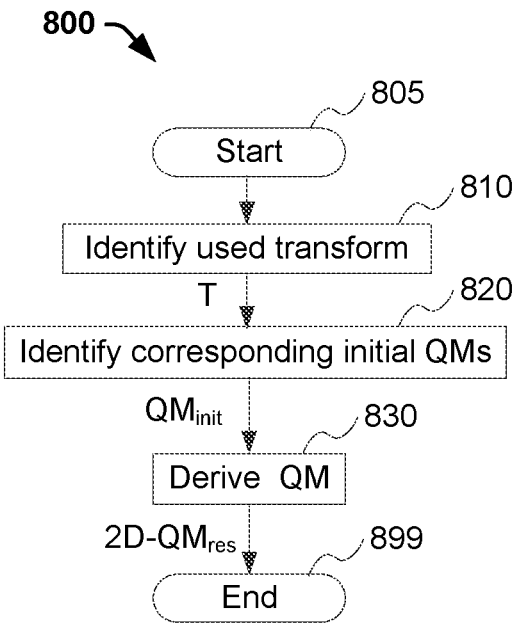
FIG. 8 illustrates a general exemplary QM derivation workflow, according to a general aspect of at least one embodiment.

Generally, it is considered that different transforms (separable or non-separable) are available and can be dynamically selected. The selection can be typically made at the CU level, but it can also be made at a higher level such as a group of CUs, slice, tile, picture, sequence level. It is also considered that some of those various transforms are based on P horizontal/vertical transforms $T_1, \ldots, T_p$, and that the horizontal/vertical transforms used for the horizontal and the vertical transforms of a block can differ. For instance, a prediction residual block U can be transformed as follows:

$[C]_{M \times N} = [T_i]^T_{N \times N} \times [U]_{M \times N} \times [T_j]_{M \times M}$, $i$ and $j$ can be the same or different For instance, P=6 for the current JEM, and the following horizontal/vertical transforms are used:

$T_1$—identity matrix (transform skip)
$T_2$—DCT-II
$T_3$—DCT-V
$T_4$—DCT-VIII
$T_5$—DST-I
$T_6$—DST-VII FIG. 8 illustrates a general exemplary QM derivation workflow 800, according to an embodiment. Method 800 can be used at the encoder or the decoder side. In general, the same quantization matrix should be used for encoding or decoding the same block for the bitstream to be properly decoded.

Method 800 starts at step 805, and ends at step 899. At step 810, the encoder or decoder identifies the transform or combination of horizontal/vertical transforms T. Then the encoder or decoder identifies (820) one or several corresponding initial QMs, noted $QM_{init}$, from the transform T. Then the final QM 2D-$QM_{res}$ is derived (830) from the initial QMs $QM_{init}$.

Method 800 can be implemented off-line and the resulting QMs can be stored, for example, in a look-up table with a QM for each combination of vertical and horizontal transforms, for the encoder or decoder. During the encoding or decoding, based on the used transform, the encoder or decoder can retrieve the corresponding QM.

For ease of notations, we define the terms "2D QM" and "1D QM." A 2D QM is a 2D matrix $[2D-Q]_{M \times N}$ that specifies the scaling values to be applied to the coefficients of a transform block $[C]_{M \times N}$. For instance, in HEVC, the default intra 2D-matrix $[2D-Q]_{8 \times 8}$ is defined as shown in the right of FIG. 6. A 1D QM is a 1D-matrix (or vector) $[1D-Q]_K$ that specifies the scaling values to be applied to the coefficients of a row or column $[C]_K$ of a transform block. For instance, the following 1D-matrix/vector $[1D-Q]_8$ can be defined:

$[1D-Q]_8 = [16\,16\,16\,16\,17\,18\,21\,24]^T$

In the following, different solutions to adapt the QMs to multiple transforms are described. In one solution, several 1D QMs are defined for different horizontal/vertical transforms, and the 1D QMs are combined to derive the 2D QM. In another embodiment, one or several 2D QMs are defined, and one of these QMs is selected based on the used horizontal/vertical transforms, where the selected 2D QM may be further modified based on the used horizontal/vertical transforms.

Figure 9:
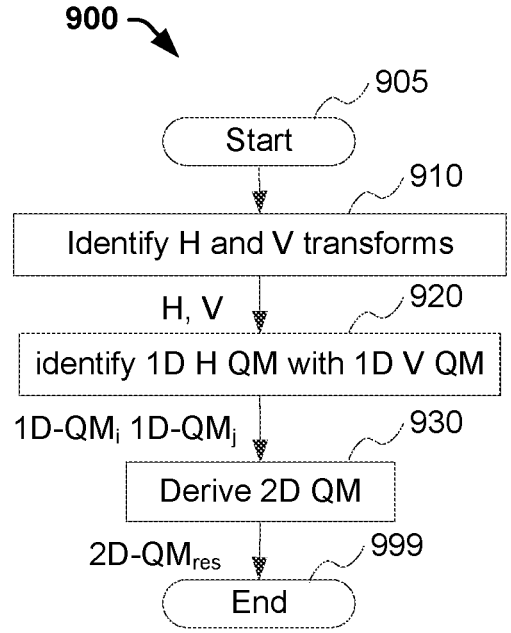
FIG. 9 illustrates an exemplary method for deriving 2D QMs based on 1D QMs, according to a general aspect of at least one embodiment.

FIG. 9 illustrates an exemplary method 900 for deriving 2D QMs based on 1D QMs, according to an embodiment. Method 900 starts at step 905, and ends at step 999. During the initialization stage, multiple 1D QMs: 1D-$QM_1, \ldots,$ 1D-$QM_K$ can be defined, for the P different possible horizontal/vertical transforms, or for different sets of horizontal/vertical transforms (K≤P). In one example, based on similarities between transforms, K=4, and 4 1D QMs can be defined:

1D-$QM_1$—for $T_1$ (typically, flat matrix)
1D-$QM_2$—for $T_2$ (DCT-II) and $T_5$ (DST-I)
1D-$QM_3$—for $T_3$ (DCT-V) and $T_6$ (DST-VII)
1D-$QM_4$—for $T_4$ (DCT-VIII)

In another example, K=2, and 2 1D-QMs can be defined:

1D-$QM_1$—for $T_1$ (typically, flat matrix)
1D-$QM_2$—for all the other transforms Then, at step 910, the encoder or decoder identifies the horizontal and vertical transforms H and V, each one being in the set $\{T_1, \ldots T_p\}$. Step 910 can be used as a specific implementation for step 810. To simplify the notations, we use "C" instead of "$[C]_{M \times N}$" here: C=V×U×H, where V=$T_i^T \in \{T_1^T, \ldots T_p^T\}$, and H=$T_j \in \{T_1, \ldots T_p\}$.

The corresponding 1D QMs, 1D-$QM_i$ and 1D-$QM_j$ (i, j≤K) for the horizontal and vertical directions, can be selected (920) based on the type of identified horizontal and vertical transforms H and V. The two 1D QMs can be signaled in the bitstream, or can be default 1D QMs. Step 920 can be used as a specific implementation for step 820, where $QM_{init}$ includes 1D-$QM_H$=1D-$QM_i$ and 1D-$QM_V$=1D-$QM_j$.

At step 930, the two selected 1D QMs 1D-$QM_i$ and 1D-$QM_j$ are combined to obtain the final 2D QM, 2D-$QM_{res}$, that will be applied to quantize 2D transform coefficient blocks obtained using H and V as transforms. Step 930 can be used as a specific implementation for step 830 for the case of using 1D QMs.

The derivation of a 2D QM, 2D-$QM_{res}$ from two 1D-QMs can be expressed as a mathematical function F( ) defined as follows:

$2D\text{-}QM_{res} = F(1D\text{-}QM_H, 1D\text{-}QM_V)$

In an embodiment, the function F must obey the following constraints. The constraints here are mainly based on the transform skip (flat quantization matrix) and the DCT-II transform. In other embodiments, the constraints can be from other transforms, and more or fewer constraints can be considered. Using a transform of 8×8 as an example, the constraints are defined as the follows:

$F(Q1_{flat}, Q1_{flat}) = Q2_{flat}$ $F(Q1_{DCT-II}, Q1_{DCT-II}) = Q2_{DCT-II}$ $F(Q1_{DCT-II}, Q1_{flat}) = Q2_{DCT-II}$ $F(1D\text{-}QM_H, 1D\text{-}QM_V) = F^T(1D\text{-}QM_V, 1D\text{-}QM_H)$ where $Q1_{flat}$ is the vector made of 8 elements of same value (e.g., 16)
$Q2_{flat}$ is the square matrix made of 8×8 elements of same value (e.g., 16)
$Q2_{DCT-II}$ is the HEVC QM built for DCT-II using the HVS
$Q1_{DCT-II}$ is the first column of the $Q2_{DCT-II}$ $Q'2_{DCT-II}$ is the matrix made of 8 identical rows, corresponding to the first row of the $Q2_{DCT-II}$ Here we use a value of 16 as corresponding to a neutral scaling factor (no impact of the scaling factor). Other conventions could also be used. The second constraint means that if 1D-QM$_H$ and 1D-QM$_V$ are both $Q1_{DCT-II}$, their composition must give the usual default QM used for the DCT-II ($Q2_{DCT-II}$). Table 2 shows exemplary matrices for $Q1_{flat}$, $Q2_{flat}$, $Q1_{DCT-II}$, and $Q2_{DCT-II}$.

TABLE 2

Example of matrices $Q1_{flat}$, $Q2_{flat}$, $Q1_{DCT-II}$, $Q2_{DCT-II}$ $Q1_{flat}$

| 16 | 16 | 16 | 16 | 16 | 16 | 16 | 16 |
|----|----|----|----|----|----|----|----|
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |

$Q2_{flat}$ $Q1_{DCT-II}$

| 16 | 16 | 16 | 16 | 16 | 17 | 18 | 21 | 24 |
|----|----|----|----|----|----|----|----|----|

$Q2_{DCT-II}$

| 16 | 16 | 16 | 16 | 16 | 17 | 19 | 22 | 25 |
|----|----|----|----|----|----|----|----|----|
| 16 | 16 | 16 | 17 | 18 | 20 | 22 | 25 | 29 |
| 16 | 16 | 16 | 18 | 21 | 24 | 27 | 31 | 36 |
| 17 | 17 | 17 | 20 | 24 | 30 | 35 | 41 | 47 |
| 18 | 18 | 19 | 22 | 27 | 35 | 44 | 54 | 65 |
| 21 | 21 | 22 | 25 | 31 | 41 | 54 | 70 | 88 |
| 24 | 24 | 25 | 29 | 36 | 47 | 65 | 88 | 115 |

$Q'2_{DCT-II}$

| 16 | 16 | 16 | 16 | 17 | 18 | 21 | 24 |
|----|----|----|----|----|----|----|----|
| 16 | 16 | 16 | 16 | 17 | 18 | 21 | 24 |
| 16 | 16 | 16 | 16 | 17 | 18 | 21 | 24 |
| 16 | 16 | 16 | 16 | 17 | 18 | 21 | 24 |
| 16 | 16 | 16 | 16 | 17 | 18 | 21 | 24 |
| 16 | 16 | 16 | 16 | 17 | 18 | 21 | 24 |
| 16 | 16 | 16 | 16 | 17 | 18 | 21 | 24 |
| 16 | 16 | 16 | 16 | 17 | 18 | 21 | 24 |

Figure 10:
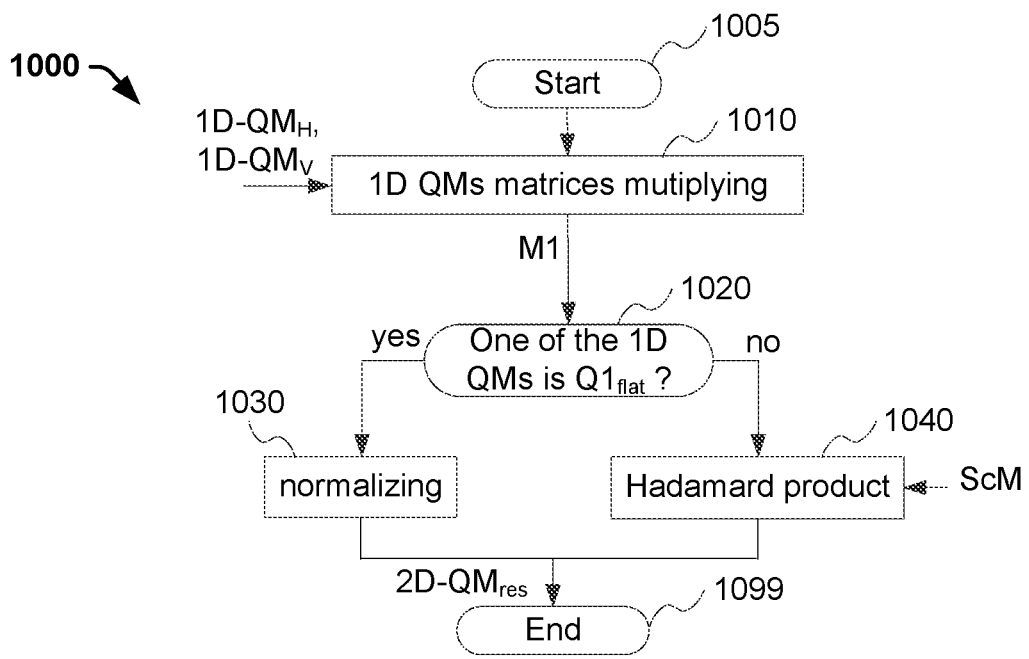
FIG. 10 illustrates an exemplary process for satisfying QM design constraints, according to a general aspect of at least one embodiment.

One solution to satisfy these constraints is to apply process 1000 as illustrated in FIG. 10, as an implementation of the function F( ). Method 1000 starts at step 1005, and ends at step 1099. At step 1010, the 2D matrix M1 is obtained by the following matrix multiplication:

$$M1 = 1D\text{-}QM_V \times 1D\text{-}QM_H^T$$

where the operator "x" is the product between matrices. Then, a test is done to check if one of the 1D QMs is $Q1_{flat}$ (1020). If one of the 1D QMs is $Q1_{flat}$, then M1 is used as is, possibly after normalization (1030) by a given factor Norm, typically 16, in order to get consistent scaling values as $Q2_{DCT-II}$:

$$2D\text{-}QM_{res} = M1/\text{Norm}.$$

An alternative implementation of process 1000 uses the Hadamard product (noted "●") of M1 using a scaling matrix ScM$_{flat}$:

$$2D\text{-}QM_{res} = M1 \cdot \text{ScM}_{flat}$$

where ScM$_{flat}$ is defined as follows: $(Q1_{flat} \times Q1_{DCT-II}^T) \bullet \text{ScM}_{flat} = K1 \cdot Q'2_{DCT-II}$ with K1 being a normalizing factor. An exemplary ScM$_{flat}$ matrix is depicted below (K1 being equal to (1<<12)). Note that ScM$_{flat}$[x,y]/K1=1/16, that is, 1/Norm. Therefore, this equation is indeed equivalent to 2D-QM$_{res}$=M1/Norm.

TABLE 3

Example of matrix ScM$_{flat}$.

| 256 | 256 | 256 | 256 | 256 | 256 | 256 | 256 |
|-----|-----|-----|-----|-----|-----|-----|-----|
| 256 | 256 | 256 | 256 | 256 | 256 | 256 | 256 |
| 256 | 256 | 256 | 256 | 256 | 256 | 256 | 256 |
| 256 | 256 | 256 | 256 | 256 | 256 | 256 | 256 |
| 256 | 256 | 256 | 256 | 256 | 256 | 256 | 256 |

TABLE 3-continued

Example of matrix ScM$_{flat}$.

| 256 | 256 | 256 | 256 | 256 | 256 | 256 | 256 |
|-----|-----|-----|-----|-----|-----|-----|-----|
| 256 | 256 | 256 | 256 | 256 | 256 | 256 | 256 |
| 256 | 256 | 256 | 256 | 256 | 256 | 256 | 256 |

Otherwise (if none of the 1D QMs is $Q1_{flat}$), the Hadamard product of M1 is computed (1040) using a scaling matrix ScM:

$$2D\text{-}QM_{res} = M1 \cdot \text{ScM}$$

where ScM is defined as follows: $(Q1_{DCT-II} \times Q1_{DCT-II}^T) \bullet \text{ScM} = K1 \cdot Q2_{DCT-II}$ with K1 being a normalizing factor. An exemplary ScM matrix is depicted below (K1 being equal to (1<<12)).

TABLE 4

Example of matrix ScM.

| 256 | 256 | 256 | 256 | 256 | 256 | 256 | 256 |
|-----|-----|-----|-----|-----|-----|-----|-----|
| 256 | 256 | 256 | 256 | 256 | 270 | 268 | 267 |
| 256 | 256 | 272 | 288 | 301 | 313 | 305 | 309 |
| 256 | 256 | 288 | 336 | 361 | 384 | 378 | 384 |
| 256 | 256 | 301 | 361 | 425 | 468 | 470 | 472 |

TABLE 4-continued

Example of matrix ScM.

| 256 | 270 | 313 | 384 | 468 | 556 | 585 | 616 |
| 256 | 268 | 305 | 378 | 470 | 585 | 650 | 715 |
| 256 | 267 | 309 | 384 | 472 | 616 | 715 | 818 |

In an embodiment, the matrix ScM can be replaced by an analytic function Sc(i, j) where i and j are the indices of the matrix coefficients, using the following formula:

$$2D\text{-}QM_{res}(i,j) = M1(i,j) * Sc(i,j)$$

In an example, $Sc(i,j) = \alpha^{i \cdot j} \div 16$, where $\alpha$ is a parameter that can be pre-defined, or coded in the bitstream, and "÷" is used to denote division in mathematical equations where no truncation or rounding is intended.

If $\alpha = 1.024$, and using floating-point computations, with a final rounding to the nearest integer value, the resulting matrix $2D\text{-}QM_{res}$ is as follows when $1D\text{-}QM_H$ and $1D\text{-}QM_V$ are $Q1_{DCT\text{-}II}$, which provides an approximation close to $Q2_{DCT\text{-}II}$:

TABLE 5

| 16 | 16 | 16 | 16 | 17 | 18 | 21 | 24 |
| 16 | 16 | 17 | 17 | 19 | 20 | 24 | 28 |
| 16 | 17 | 18 | 18 | 21 | 23 | 28 | 33 |
| 16 | 17 | 18 | 20 | 23 | 26 | 32 | 39 |
| 17 | 19 | 21 | 23 | 26 | 31 | 39 | 50 |
| 18 | 20 | 23 | 26 | 31 | 37 | 48 | 62 |
| 21 | 24 | 28 | 32 | 39 | 48 | 65 | 85 |
| 24 | 28 | 33 | 39 | 50 | 62 | 85 | 115 |

Fixed-point implementations can be derived from this design. For example, the $2D\text{-}QM_{res}$ can be calculated using integer operations:

$$2D\text{-}QM_{res}(i,j) = ((M1(i,j) << \text{Int}(i*j/K2)) * LUT[(i*j) \% K2] + (2^{R-1} * \text{Norm}))/(2^R * \text{Norm})$$

where K2 is a constant integer value, and LUT1 [k] is a look-up table derived as follows:

$$LUT1[k] = \text{Round}(2^R 2^{\frac{k}{K2}})$$

where R is an integer, and k is also an integer from 0 to (K2-1), and Round(r) is the nearest integer value of r.

Then for K2=29, R=8, and Norm=16, we have:

LUT1[0 . . . 28]={256,262,269,275,282,288,295,303,
310,317,325,333,341,349,358,366,375,384,394,
403,413,423,433,444,454,465,477,488,500} and the resulting matrix $2D\text{-}QM_{res}$ approximation is the following one:

TABLE 6

| 16 | 16 | 16 | 16 | 17 | 18 | 21 | 24 |
| 16 | 16 | 16 | 17 | 18 | 20 | 24 | 28 |
| 16 | 16 | 17 | 18 | 20 | 22 | 27 | 33 |
| 16 | 17 | 18 | 19 | 22 | 25 | 32 | 39 |
| 17 | 18 | 20 | 22 | 26 | 30 | 39 | 49 |
| 18 | 20 | 22 | 25 | 30 | 36 | 48 | 62 |
| 21 | 24 | 27 | 32 | 39 | 48 | 65 | 85 |
| 24 | 28 | 33 | 39 | 49 | 62 | 85 | 116 |

It should be noted that here the constraint on $(F(Q1_{DCT\text{-}II}, Q1_{DCT\text{-}II}) = Q2_{DCT\text{-}II})$ is not exactly satisfied, but closely approximated.

Figure 11:
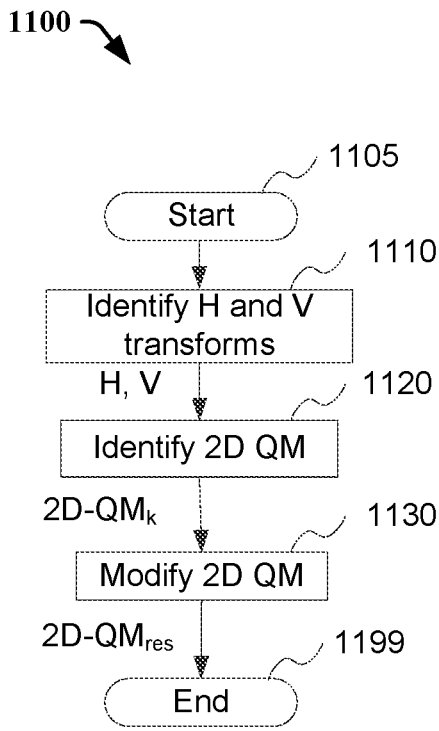
FIG. 11 illustrates another exemplary method for deriving 2D QMs, according to a general aspect of at least one embodiment.

FIG. 11 illustrates another exemplary method 1100 for deriving 2D-QMs, according to an embodiment. Method 1100 starts at step 1105, and ends at step 1199. During the initialization stage, one or several 2D QMs: $2D\text{-}QM_1, \ldots, 2D\text{-}QM_K$ can be defined. For example, L=2, and 2 QMs can be defined:

$2D\text{-}QM_1$—a flat matrix, associated with the horizontal/vertical combination $(T_1, T_1)$ $2D\text{-}QM_2$—the HEVC QM matrix, associated with all the other horizontal/vertical combinations $(T_i, T_j)$ Based on the horizontal and vertical transforms H and V, a specific 2D QM is selected among a set of possible 2D QMs, then modified. In particular, at step 1110, the horizontal and vertical transforms H and V are identified. Step 1110 can be used as a specific implementation for step 810.

Then the corresponding 2D QM, $2D\_QM_k$ ($k \leq K$), associated with the combined horizontal and vertical transforms H and V, is selected (1120). Step 1120 can be used as a specific implementation for step 820.

The selected 2D QM is then modified (1130) based on horizontal and vertical transforms, which results in the final 2D-QM, $2D\text{-}QM_{res}$. Step 1130 can be used as a specific implementation for step 830.

In one example, the modification of a 2D QM, $2D\text{-}QM_k$ is based on two 1D-QMs, $1D\text{-}QM_H$, $1D\text{-}QM_V$, and can be expressed as a mathematical function G( ) defined as follows:

$$2D\text{-}QM_{res} = G(2D\text{-}QM_k, 1D\text{-}QM_H, 1D\text{-}QM_V)$$

In an embodiment, the default 2D QM is $Q2_{DCT\text{-}II}$, and the function G must obey the following constraints:

$$G(Q2_{DCT\text{-}II}, Q1_{flat}, Q1_{flat}) = Q2_{flat}$$

$$G(Q2_{DCT\text{-}II}, Q1_{DCT\text{-}II}, Q1_{DCT\text{-}II}) = Q2_{DCT\text{-}II}$$

$$G(Q2_{DCT\text{-}II}, Q1_{DCT\text{-}II}, Q1_{flat}) = Q'2_{DCT\text{-}II}$$

$$G(2D\text{-}QM_k, 1D\text{-}QM_H, 1D\text{-}QM_V) = G^T(2D\text{-}QM_k, 1D\text{-}QM_V, 1D\text{-}QM_H)$$

One solution to satisfy these constraints is to apply the following process:

If $1D\text{-}QM_H$, $1D\text{-}QM_V$ are both $Q1_{flat}$, $2D\text{-}QM_{res}[x][y] = 2D\text{-}QM_k[0][0]$, for any position (x,y) in the transform block Otherwise If $1D\text{-}QM_H$ is $Q1_{flat}$, $2D\text{-}QM_{res}[x][y] = 2D\text{-}QM_k[0][y]$, for any position (x,y) in the transform block Otherwise If $1D\text{-}QM_V$ is $Q1_{flat}$, $2D\text{-}QM_{res}[x][y] = 2D\text{-}QM_k[x][0]$, for any position (x,y) in the transform block Otherwise Compute the 2D matrix M1 obtained by the following matrix multiplication as 1010

$$M1 = 1D\text{-}QM_V \times 1D\text{-}QM_H^T$$

Compute the following matrix $$2D\text{-}QM_{res} = 2D\text{-}QM_k \cdot M1 \cdot ScM'/K2$$

where ScM' is defined such as:

$$ScM' \cdot (Qi_{DCT\text{-}II} \times Q1_{DCT\text{-}II}^T) = K2 \times \begin{bmatrix} 1 & \cdots & 1 \\ \cdots & \cdots & \cdots \\ 1 & \cdots & 1 \end{bmatrix}$$

with K2 being a normalizing factor.

Figure 12:
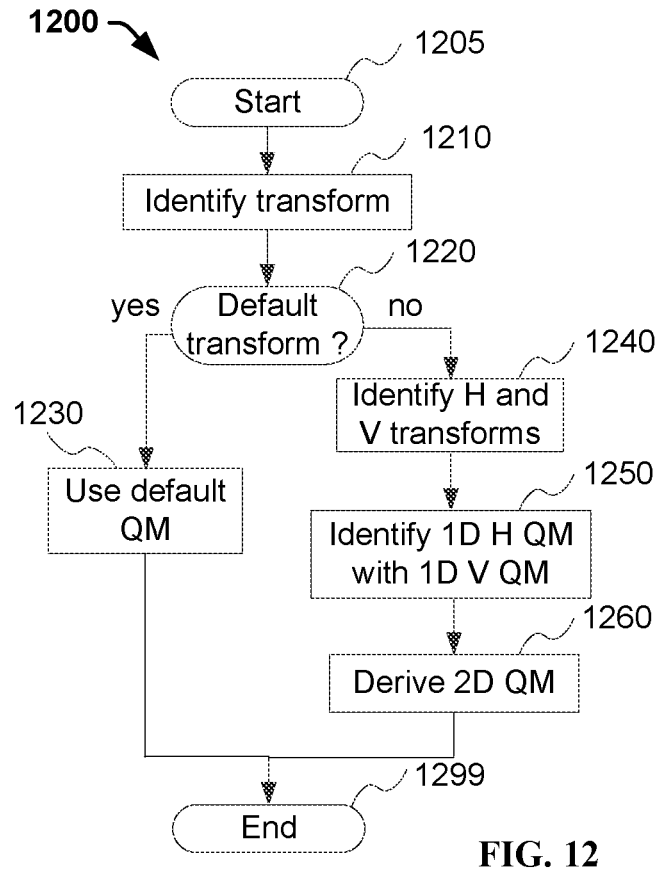
FIG. 12 illustrates an exemplary method for deriving the 2D QM, using a default 2D QM in addition to 1D QMs, according to a general aspect of at least one embodiment.

FIG. 12 illustrates an exemplary method 1200 for deriving the 2D QM, using a default 2D QM in addition to 1D QMs, according to an embodiment. In this embodiment, one default transform (for instance a similar transform as the DCT transform used in HEVC) or a set of default transforms is defined, and a default 2D QM is also defined, associated with this default transform or with this set of default transforms. In addition, different 1D QMs are defined corresponding to different sets of horizontal/vertical transforms, for example, as described above.

Method 1200 starts at step 1205, and ends at step 1299. At step 1210, the encoder or decoder identifies the transform. The encoder or decoder checks (1220) whether the transform is in the set of default transforms or not. If the transform is in the set of default transforms, the default QM is selected (1230). Otherwise, if the transform is not in the set of default transforms, the encoder or decoder identifies (1240) the horizontal and vertical transforms H and V, and selects (1250) the corresponding 1D QMs for the horizontal and vertical directions. The 2D QM is then obtained (1260) by combining the two selected 1D QMs, for example, using the processes described with respect to method 900.

Figure 13:
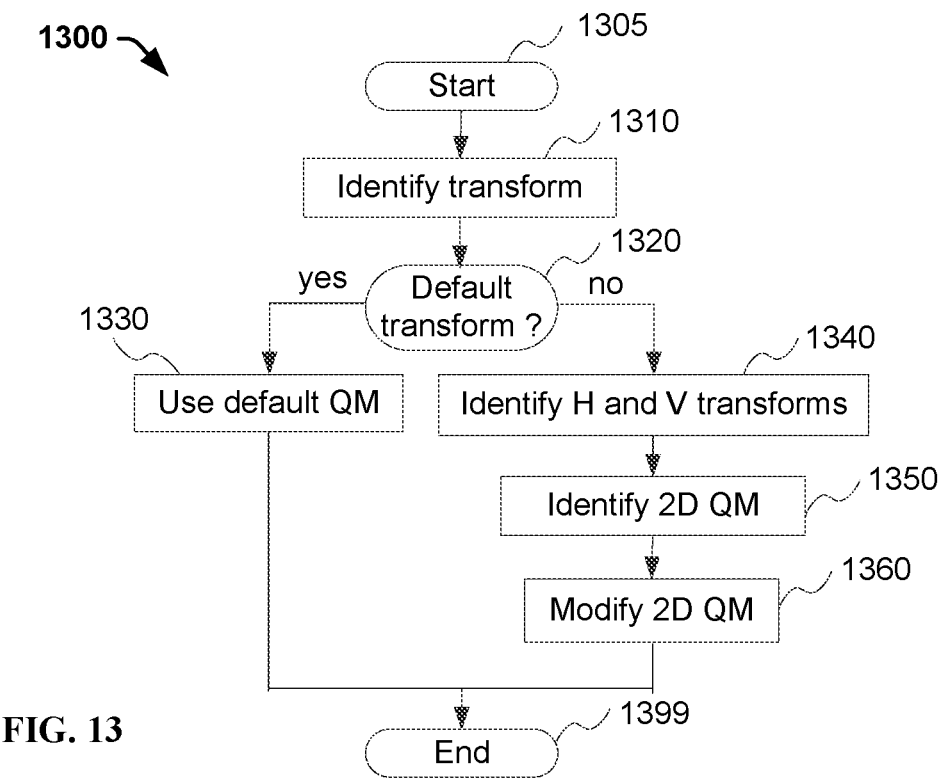
FIG. 13 illustrates another exemplary method for deriving the 2D QM, using a default 2D QM and alternative 2D QMs, according to a general aspect of at least one embodiment.

FIG. 13 illustrates another exemplary method 1300 for deriving the 2D QM, using a default 2D QM and alternative 2D-QMs, according to an embodiment. Method 1300 starts at step 1305 and ends at step 1399. Steps 1310-1340 may be performed similarly to steps 1210-1240 in method 1200. At step 1350, the encoder or decoder identifies the corresponding 2D QM. At step 1360, the selected 2D QM is modified, according to the horizontal and vertical transforms, to obtain the final 2D QM, for example, using the processes described with respect to method 1100.

In a simplified version, only the default 2D QM is defined, and at step 1350, the encoder or decoder just selects the default 2D QM as the 2D QM.

In the current HEVC specification, deriving the scaling factors (QM values), m[x][y], for a transform coefficient at location (x,y), is based on the following semantics:

The scaling factor m[x][y] is derived as follows:
If one or more of the following conditions are true, m[x][y] is set equal to 16:
  scaling_list_enabled_flag is equal to 0.
  transform_skip_flag[xTbY][yTbY] is equal to 1 and nTbS is greater than 4.
Otherwise, the following applies:

$m[x][y]$=ScalingFactor[sizeId][matrixId][$x$][$y$]

where
  scaling_list_enabled_flag is a high level flag indicating whether the quantization matrices are used or not,
  transform_skip_flag is a flag at the block level indicating whether the transform is skipped or not for the block,
  sizeId is a scalar value indicating the block size,
  matrixId is a value indicative of the coding mode for the block,
  ScalingFactor is an array comprising the values of scaling factors (that is, QM values) for all the considered block sizes (identified by sizeId) and coding modes (identified by matrixId),
  (xTbY, yTbY) is a luma location specifying the top-left sample of the current luma transform block relative to the top-left luma sample of the current picture,
  nTbS is a variable specifying the size of the current transform block.

To adapt to the variety of transforms, the following process can be used according an aspect of the present embodiments.

The scaling factor m[x][y] is derived as follows:
If the horizontal and vertical transforms are transform skip, m[x][y] is set equal to 16.
Otherwise, if the horizontal transform is transform skip, m[x][y] is derived as:

$m[x][y]$=ScalingFactor[sizeId][matrixId][0][$y$]

Otherwise, if the vertical transform is transform skip, m[x][y] is derived as:

$m[x][y]$=ScalingFactor[sizeId][matrixId][$x$][0]

Otherwise, m[x][y] is derived as:

$m[x][y]$=ScalingFactor[sizeId][matrixId][$x$][$y$]

Here, the same array ScalingFactor is used for different combinations of transforms:
1. V: transform skip, H: not transform skip
2. V: not transform skip, H: transform skip
3. V: not transform skip, H: not transform skip During the parsing stage, the actual quantization scaling matrix to be used is derived. For example, when transform skip is used for the horizontal direction, elements in the same row are set to be the same, namely, all elements in row y is set to the value of element (0, y). Alternatively, when transform skip is used for the vertical direction, elements in the same column are set to be the same, namely, all elements in column x is set to the value of element to (x, 0).

The advantage of this design is the simplicity as it involves limited changes compared to the HEVC process, while still being able to support a variety of QMs for different combinations of 1D QMs among the case of "transform skip" and "not transform skip."

In a different embodiment, different ScalingFactor arrays can be used for different combinations of transforms, to improve perceptual quality. For example, different values can be used for the vertical structures and for the horizontal structures, as the human perception may change for these two directions. Note that here we use the HEVC as the example, but the concept can be used for other codecs.

As shown in FIG. 5, in HEVC, only 2D QMs are considered in the syntax signaling. To adapt to different embodiments that use 1D QMs as described above, signaling for 1D QMs is proposed.

In one embodiment, P horizontal/vertical transforms are defined, and possibly grouped together into K sets of horizontal/vertical transforms. K default 1D QMs are defined for these K sets of horizontal/vertical transforms respectively, but alternative 1D QMs can also be signaled, in place of the defaults 1D QMs. The following syntax can for instance be used.

| | Descriptor |
|---|---|
| scaling_list_data( ) { | |
| ... | |
| for( transformSet = 0; transformSet < K; transformSet++ ) { | |
|   scaling_list_1D_pred_mode_flag[ transformSet ] | u(1) |
|   if( !scaling_list_1D_pred_mode_flag[ transformSet ] ) | |
|     nextCoef = 8 | |
|     for( i = 0; i < coefNum; i++ ) { | |
|       scaling_list_1D_delta_coef | se(v) |
|       nextCoef = ( nextCoef + | |
|       scaling_list_1D_delta_coef + 256 ) % 256 | |
|       ScalingList1D[ transformSet ][ i ] = nextCoef | |
|     } | |

-continued

| Descriptor |
|---|
| } |
| } |
| ... |
| } | where
- transformSet is the number of the considered horizontal/vertical transforms set,
- coefNum is the number of 1D QM values to be coded (typically equal to 8, for horizontal/vertical transforms applying to block width or height equal to 8),
- scaling_list_1D_pred_mode_flag indicates if the default 1D QM is used, or if an alternate 1D QM is signaled,
- ScalingList1D is a table containing the 1D QM values,
- nextCoef and scaling_list_1D_delta_coef are intermediate parameters used for computing the values of ScalingList1D.

This signaling can be done for various block sizes (e.g., identified by the sizeId value as in HEVC) or different coding modes (e.g., identified by matrixId value as in HEVC). In that case, the syntax elements scaling_list_1D pred_mode_flag and ScalingList1D have additional dimensions corresponding to these two additional parameters (e.g., scaling_list_1D_pred_mode_flag[sizeId] [matrixId] [transformSet]).

Figure 14:
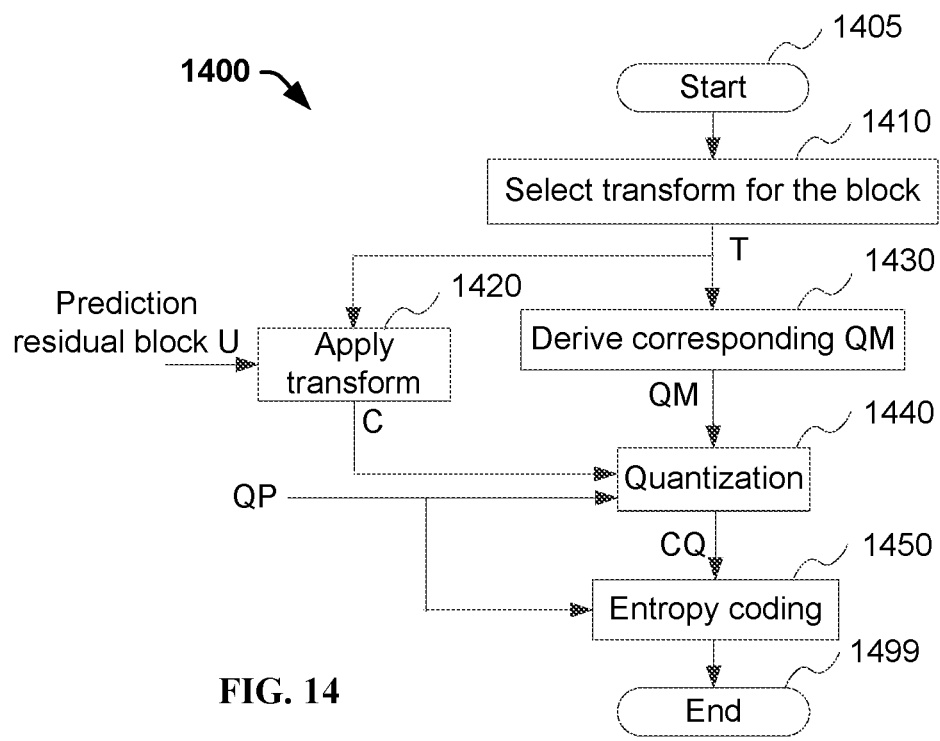
FIG. 14 illustrates an exemplary method for applying the QM in an encoder, according to a general aspect of at least one embodiment.

FIG. 14 illustrates an exemplary method 1400 for applying the QM in an encoder, according to an embodiment. For a block to be encoded, method 1400 starts at step 1405 and ends at step 1499. At step 1410, the encoder selects the transform T to be applied to the prediction residuals of the considered block. The prediction residual block U is then transformed (1420) by the selected transform T, resulting in the transform coefficients block C. The QM corresponding to the selected transform T is derived (1430), for example, using various embodiments as described above, or identified (1430) if it was already pre-computed. The quantization is then applied (1440) to the block of transform coefficients C, using as input the QM and the quantization parameter QP. The output is the block of quantized coefficients CQ. Then the quantized coefficients CQ are entropy coded (1450).

Figure 15:
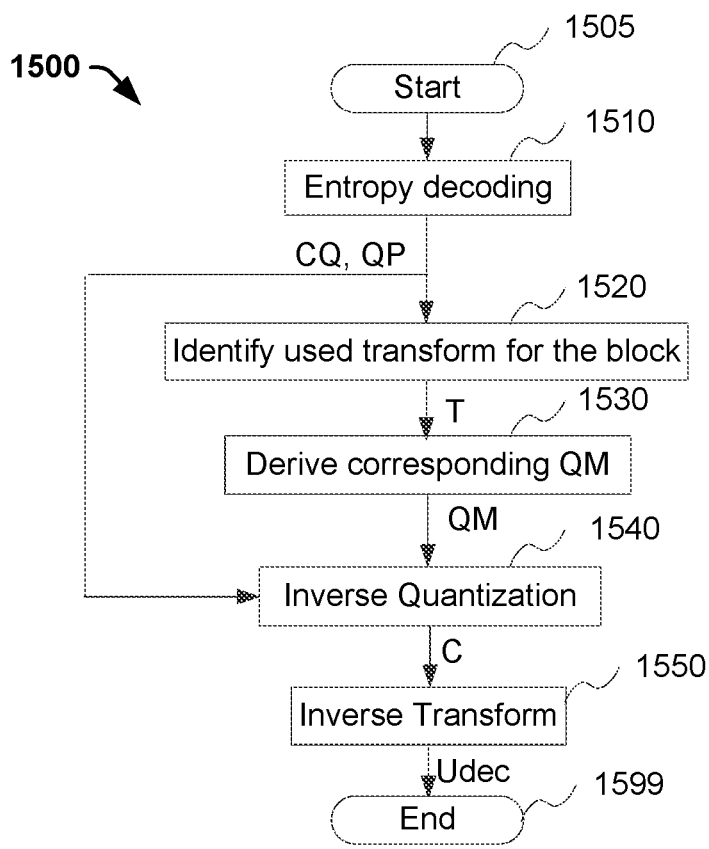
FIG. 15 illustrates an exemplary method for applying the QM in a decoder, according to a general aspect of at least one embodiment.

FIG. 15 illustrates an exemplary method 1500 for applying the QM in a decoder, according to an embodiment. For a block to be decoded, method 1500 starts at step 1505 and ends at step 1599. At step 1510, the entropy decoding (1510) provides the quantized coefficients CQ and the QP for the block. The decoder then identifies (1520) the transform T to be applied to the block. Note the transform information can be decoded from syntax elements present in the bitstream, or inferred at the decoder.

For instance, in HEVC, two types of transforms are supported, in addition to the possibility to skip the transform (indicated by a flag transform_skip_flag signaled at the transform block level). The transform actually used is derived from the coding mode of the CU, the size of the transform block, and the type of the color component. In the JEM, as previously explained, the transform type is derived from the intra prediction mode of a CU, from a flag indicating if the multiple transforms are enabled for the CU, and if this flag is true, indices indicating which horizontal and vertical transforms are used.

From the identified transform T, the QM is derived (1530), for example, using various embodiments as described above, or identified (1530) if it was already pre-computed. The inverse quantization applies (1540) to the quantized coefficients CQ, using the quantization parameter QP and the QM. This results in the de-quantized coefficients C. Then inverse transform (1550) is applied to the de-quantized coefficients C to get the decoded prediction residual block Udec.

Different embodiments are described above with respect to the design of quantization matrices when 2D separable transform is used. The concept can be extended to higher dimensions, e.g., 3D separable transforms. For instance, in the case of a 3D signal $[U]_{M \times N \times R}$ of size M×N×R, the separable 3D transform can apply using the following process:

For each r=0 to (R−1) corresponding to the index of the 3D block in the third dimension, the separable 2D transform, based on vertical transform $[A]_{N \times N}$ and horizontal transform $[B]_{M \times M}$, is applied in the first two dimensions as follows:

$$[C1]_{M \times N}(r) = [A]^T_{N \times N} \times [U]_{M \times N}(r) \times [B]_{M \times M}$$

where $[U]_{M \times N}(r)$ is the 2D matrix of size M×N, [U(m,n,r)] for m=0 ... M−1, n=0 ... N−1, from the 3D matrix $[U]_{M \times N \times R}$, and $[C1]_{M \times N}(r)$ is the 2D matrix of size M×N, [C1(m,n,r)] for m=0 ... M−1, n=0 ... N−1, from a 3D matrix $[C1]_{M \times N \times R}$ containing the transform coefficients resulting from the 2D transform applied in the first two dimensions.

For each m=0 to (M−1), the transform $[D]_{R \times R}$ is applied in the third dimension as follows:

$$[C]_{N \times R}(m) = [C1]_{N \times R}(m) \times [D]_{R \times R}$$

where $[C1]_{N \times R}(m)$ is the 2D matrix of size N×R, [C1(m,n,r)] for n=0 ... N−1 and r=0 ... R−1, from the 3D matrix $[C1]_{M \times N \times R}$, and $[C]_{N \times R}(m)$ is the 2D matrix of size N×R, [C(m,n,r)] for n=0 ... N−1 and r=0 ... R−1, from the 3D matrix $[C]_{M \times N \times R}$ of 3D transform coefficients.

According to an embodiment, a 3D-QM can be defined based on three 1D-QMs, 1D-QM$_A$, 1D-QM$_B$, 1D-QM$_D$, related to each of the three transforms $[A]_{N \times N}$, $[B]_{M \times M}$ and $[D]_{R \times R}$, following similar processes as described for the 2D case:

$$3D\text{-}QM = F_{3D}(1D\text{-}QM_A, 1D\text{-}QM_B, 1D\text{-}QM_D)$$

where $F_{3D}$ is a function built on the same principles as the ones defined above for the function F.

In the above, different methods for generating the quantization matrices are mainly described with respect to HEVC, which uses square transform block. It should be noted that the present embodiments can be applied to non-square blocks, and to other quantization schemes, for example, when scaling to compensate the transform norms is incorporated in the quantization, or when no-URQ methods are used for quantization.

Various methods are described above, and each of the methods comprises one or more steps or actions for achieving the described method. Unless a specific order of steps or actions is required for proper operation of the method, the order and/or use of specific steps and/or actions may be modified or combined.

Various numeric values are used in the present application, for example, the size of quantization matrix, or the values in the default quantization matrices. It should be noted that the specific values are for exemplary purposes and the present embodiments are not limited to these specific values.

The above methods of generating quantization matrices can be used to modify the quantization and de-quantization modules (130, 140, 240) of the JVET or HEVC encoder and decoder as shown in FIG. 1 and FIG. 2. Moreover, the present embodiments are not limited to JVET or HEVC, and can be applied to other standards, recommendations, and extensions thereof. Various embodiments described above can be used individually or in combination.

Figure 16:
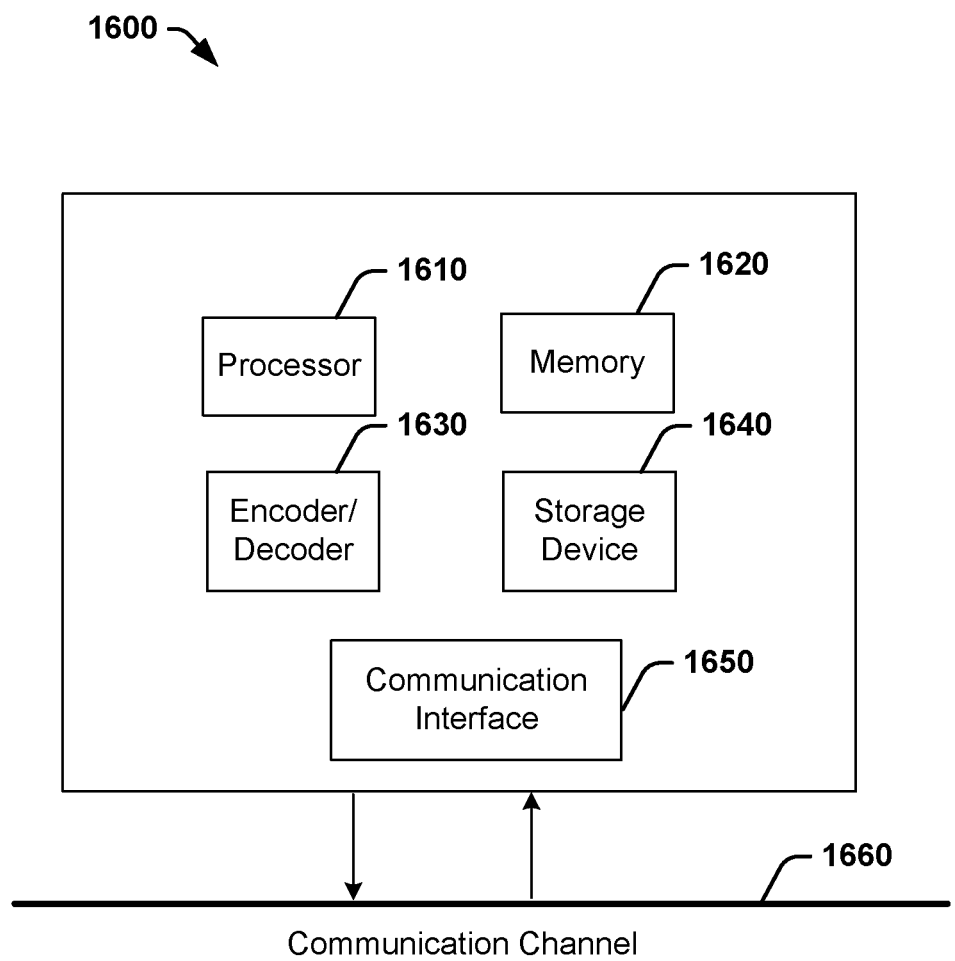
FIG. 16 illustrates a block diagram of a system within which aspects of the present embodiments can be implemented.

FIG. 16 illustrates a block diagram of an exemplary system 1600 in which various aspects of the exemplary embodiments may be implemented. The system 1600 may be embodied as a device including the various components described below and is configured to perform the processes described above. Examples of such devices, include, but are not limited to, personal computers, laptop computers, smartphones, tablet computers, digital multimedia set top boxes, digital television receivers, personal video recording systems, connected home appliances, and servers. The system 1600 may be communicatively coupled to other similar systems, and to a display via a communication channel as shown in FIG. 16 and as known by those skilled in the art to implement all or part of the exemplary video systems described above.

Various embodiments of the system 1600 include at least one processor 1610 configured to execute instructions loaded therein for implementing the various processes as discussed above. The processor 1610 may include embedded memory, input output interface, and various other circuitries as known in the art. The system 1600 may also include at least one memory 1620 (e.g., a volatile memory device, a non-volatile memory device). The system 1600 may additionally include a storage device 1640, which may include non-volatile memory, including, but not limited to, EEPROM, ROM, PROM, RAM, DRAM, SRAM, flash, magnetic disk drive, and/or optical disk drive. The storage device 1640 may comprise an internal storage device, an attached storage device, and/or a network accessible storage device, as non-limiting examples. The system 1600 may also include an encoder/decoder module 1630 configured to process data to provide encoded video and/or decoded video, and the encoder/decoder module 1630 may include its own processor and memory.

The encoder/decoder module 1630 represents the module(s) that may be included in a device to perform the encoding and/or decoding functions. As is known, such a device may include one or both of the encoding and decoding modules. Additionally, the encoder/decoder module 1630 may be implemented as a separate element of the system 1600 or may be incorporated within one or more processors 1610 as a combination of hardware and software as known to those skilled in the art.

Program code to be loaded onto one or more processors 1610 to perform the various processes described hereinabove may be stored in the storage device 1640 and subsequently loaded onto the memory 1620 for execution by the processors 1610. In accordance with the exemplary embodiments, one or more of the processor(s) 1610, the memory 1620, the storage device 1640, and the encoder/decoder module 1630 may store one or more of the various items during the performance of the processes discussed herein above, including, but not limited to the input video, the decoded video, the bitstream, equations, formulas, matrices, variables, operations, and operational logic.

The system 1600 may also include a communication interface 1650 that enables communication with other devices via a communication channel 1660. The communication interface 1650 may include, but is not limited to a transceiver configured to transmit and receive data from the communication channel 1660. The communication interface 1650 may include, but is not limited to, a modem or network card and the communication channel 1650 may be implemented within a wired and/or wireless medium. The various components of the system 1600 may be connected or communicatively coupled together (not shown in FIG. 16) using various suitable connections, including, but not limited to internal buses, wires, and printed circuit boards.

The exemplary embodiments may be carried out by computer software implemented by the processor 1610 or by hardware, or by a combination of hardware and software. As a non-limiting example, the exemplary embodiments may be implemented by one or more integrated circuits. The memory 1620 may be of any type appropriate to the technical environment and may be implemented using any appropriate data storage technology, such as optical memory devices, magnetic memory devices, semiconductor-based memory devices, fixed memory, and removable memory, as non-limiting examples. The processor 1610 may be of any type appropriate to the technical environment, and may encompass one or more of microprocessors, general purpose computers, special purpose computers, and processors based on a multi-core architecture, as non-limiting examples.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, moving the information, copying the information, calculating the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for video decoding, comprising:
accessing transform coefficients of a block of an image in a video;
de-quantizing said transform coefficients based on a quantization matrix;
inverse transforming said de-quantized transform coefficients based on a separable transform to form decoded prediction residuals, wherein said separable transform corresponds to at least a first transform and a second transform, and wherein said quantization matrix is based on a matrix product of (1) a first vector corresponding to a transform type of said first transform and (2) a second vector corresponding to a transform type of said second transform, said first and second vectors respectively specifying scaling values to be applied to a row and a column of said transform coefficients; and
decoding said block based on said decoded prediction residuals.

2. The method of claim 1, wherein coefficients of said matrix product are scaled by respective scaling factors to obtain said quantization matrix.

3. The method of claim 2, wherein said respective scaling factors are based on a power function of a value and corresponding locations of said coefficients.

4. The method of claim 1, when said first transform is transform skip, all elements in a row of said quantization matrix are same, or when said second transform is transform skip, all elements in a column of said quantization matrix are same.

5. A method for video encoding, comprising:
accessing prediction residuals of a block of an image in a video;
transforming said prediction residuals based on a separable transform to form transformed coefficients, wherein said separable transform corresponds to at least a first transform and a second transform;
quantizing said transformed coefficients based on a quantization matrix, wherein said quantization matrix is based on a matrix product of (1) a first vector corresponding to a transform type of said first transform and (2) a second vector corresponding to a transform type of said second transform, said first and second vectors respectively specifying scaling values to be applied to a row and a column of said transform coefficients; and
encoding said quantized transformed coefficients.

6. The method of claim 5, wherein coefficients of said matrix product are scaled by respective scaling factors to obtain said quantization matrix.

7. The method of claim 6, wherein said respective scaling factors are based on a power function of a value and corresponding locations of said coefficients.

8. The method of claim 5, when said first transform is transform skip, all elements in a row of said quantization matrix are same, or when said second transform is transform skip, all elements in a column of said quantization matrix are same.

9. An apparatus for decoding video data, comprising:
one or more processors, wherein said one or more processors are configured to:
access transform coefficients of a block of an image in a video;
de-quantize said transform coefficients based on a quantization matrix;
inverse transform said de-quantized transform coefficients based on a separable transform to form decoded prediction residuals, wherein said separable transform corresponds to a first transform and a second transform, and wherein said quantization matrix is based on a matrix product of (1) a first vector corresponding to a transform type of said first transform and (2) a second vector corresponding to a transform type of said second transform, said first and second vectors respectively specifying scaling values to be applied to a row and a column of said transform coefficients; and
decode said block based on said decoded prediction residuals.

10. The apparatus of claim 9, wherein coefficients of said matrix product are scaled by respective scaling factors to obtain said quantization matrix.

11. The apparatus of claim 10, wherein said respective scaling factors are based on a power function of a value and corresponding locations of said coefficients.

12. The apparatus of claim 9, when said first transform is transform skip, all elements in a row of said quantization matrix are same, or when said second transform is transform skip, all elements in a column of said quantization matrix are same.

13. An apparatus for encoding video data, comprising:
one or more processors, wherein said one or more processors are configured to:
access prediction residuals of a block of an image in a video;
transform said prediction residuals based on a separable transform to form transform coefficients, wherein said separable transform corresponds to at least a first transform and a second transform;
quantize said transform coefficients based on a quantization matrix, and wherein said quantization matrix is based on a matrix product of (1) a first vector corresponding to a transform type of said first transform and (2) a second vector corresponding to a transform type of said second transform, said first and second vectors respectively specifying scaling values to be applied to a row and a column of said transform coefficients; and
encode said quantized transform coefficients.

14. The apparatus of claim 13, wherein coefficients of said matrix product are scaled by respective scaling factors to obtain said quantization matrix.

15. The apparatus of claim 14, wherein said respective scaling factors are based on a power function of a value and corresponding locations of said coefficients.

16. The apparatus of claim 13, when said first transform is transform skip, all elements in a row of said quantization matrix are same, or when said second transform is transform skip, all elements in a column of said quantization matrix are same.

17. The method of claim 1, wherein a size of said block is M×N, M being a width and N being a height of said block, wherein said first transform is N-point and said second transform is M-point, and said first vector containing N elements and said second vector containing M elements.

18. The method of claim 5, wherein a size of said block is M×N, M being a width and N being a height of said block, wherein said first transform is N-point and said second transform is M-point, and said first vector containing N elements and said second vector containing M elements.

19. The apparatus of claim 9, wherein a size of said block is M×N, M being a width and N being a height of said block, wherein said first transform is N-point and said second transform is M-point, and said first vector containing N elements and said second vector containing M elements.

20. The apparatus of claim 13, wherein a size of said block is M×N, M being a width and N being a height of said block, wherein said first transform is N-point and said second transform is M-point, and said first vector containing N elements and said second vector containing M elements.

\* \* \* \* \*